Feb. 20, 1951 G. R. REED 2,542,357
HOPPER
Filed Oct. 19, 1944 2 Sheets-Sheet 1

INVENTOR.
GEORGE R. REED
BY
Joseph A. Fiagno

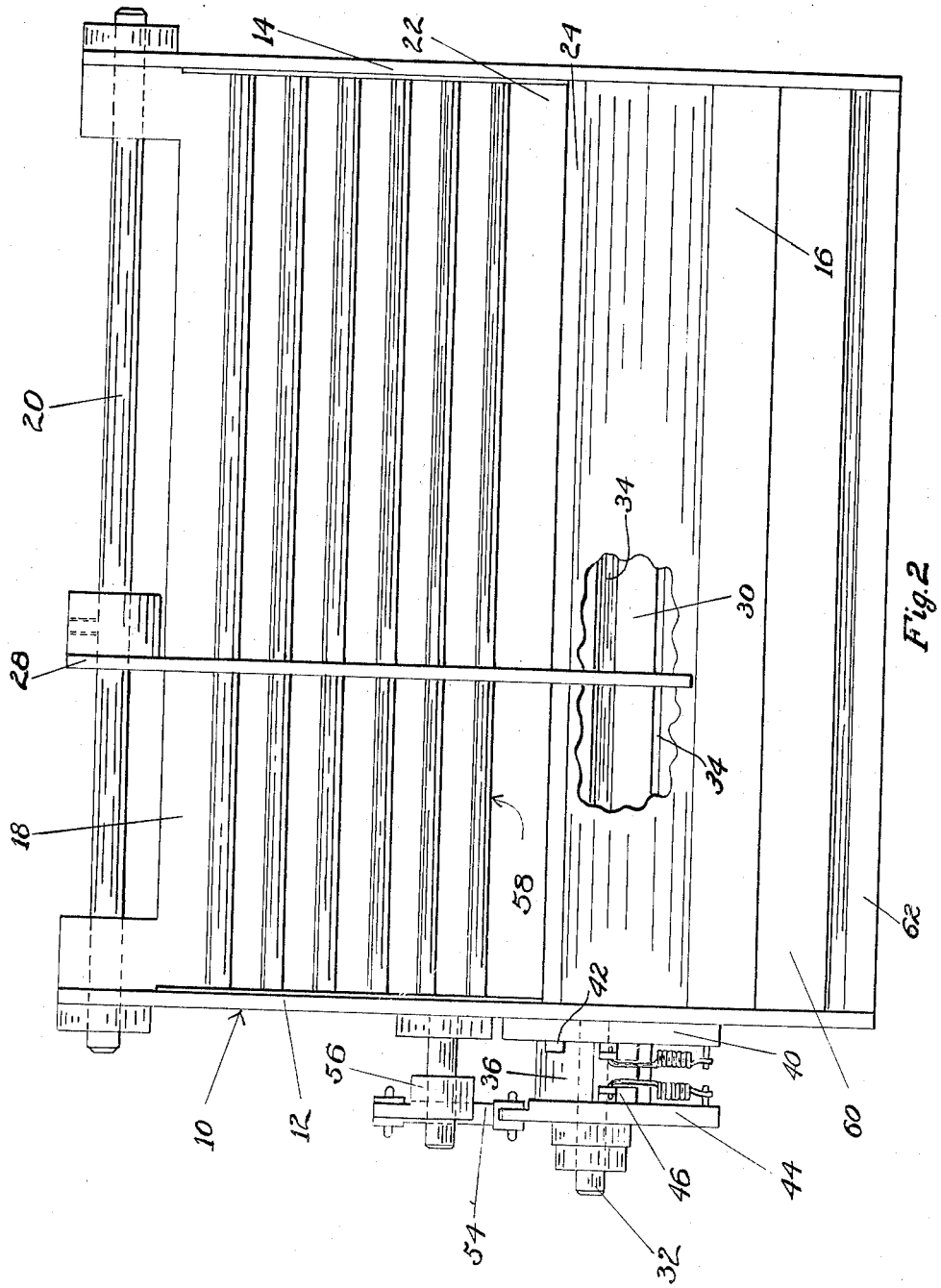

Patented Feb. 20, 1951

2,542,357

UNITED STATES PATENT OFFICE 2,542,357

HOPPER

George R. Reed, Grosse Pointe Park, Mich., assignor to Eaton Manufacturing Company, Cleveland, Ohio, a corporation of Ohio Application October 19, 1944, Serial No. 559,437

6 Claims. (Cl. 222—9)

This invention relates to dispensing devices and more particularly to hoppers and delivery mechanism incorporated therewith.

Broadly the invention comprehends a hopper having means incorporated therein providing for the alignment, agitation, and controlled deliverance of articles which it is adapted to hold.

An object of the invention is the provision of a hopper having means therein providing for positive and controlled discharge of articles from the hopper.

Another object of the invention is the provision of a hopper having means therein for aligning and agitating the articles received by the hopper and providing for the delivery thereof to means adapted to receive and discharge the articles from the hopper one by one.

A further object of the invention is the provision of a hopper having means associated therewith providing for the agitation of articles received by the hopper and other means simultaneously operable with the agitator for receiving one article at a time and likewise discharging one at a time.

A still further object of the invention is the provision of a hopper having means associated therewith for effectively preventing clogging of articles to be held thereby and simultaneously providing for the delivery of the desired number of articles as long as any of said articles remain within the hopper.

And yet a still further object of the invention is the provision of a hopper having means for the delivery of articles from the hopper and means for preventing clogging of the delivery means as well as for providing proper feeding of the articles thereto.

Other objects and advantages of the invention will appear from the following description taken in connection with the drawings, forming a part of the specification; and in which:

Figure 2 is a top plan view of the hopper and delivery mechanism;

Figure 1:
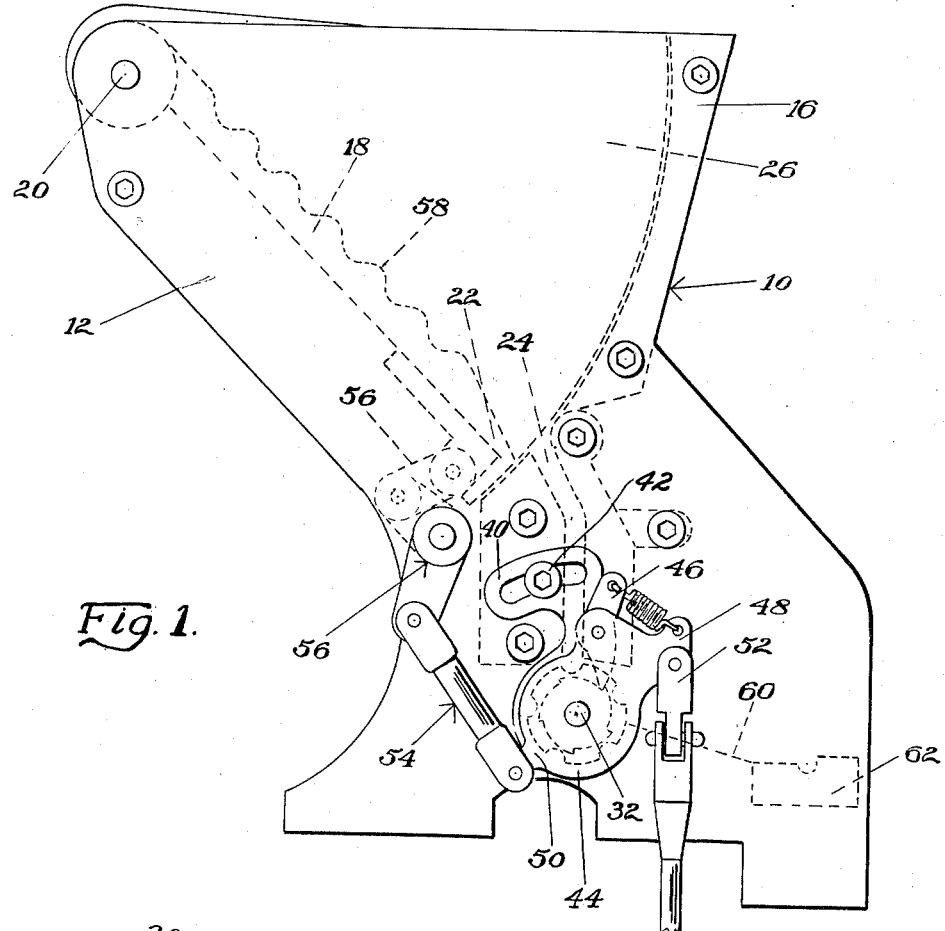
Figure 1 is a side elevational view of the hopper and delivery mechanism incorporated therewith.
Figures 3, 4:
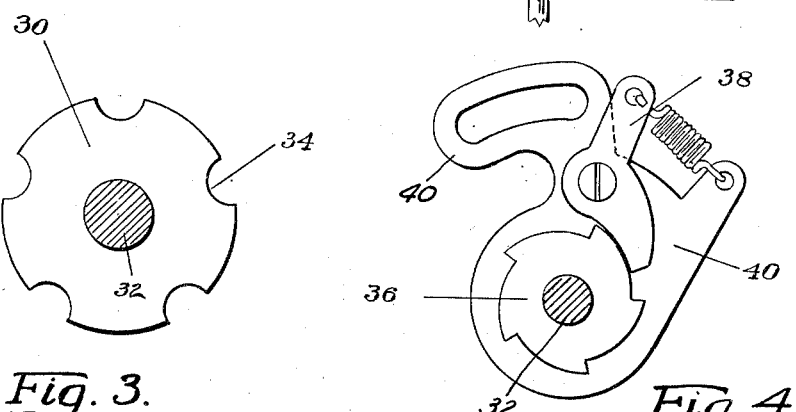
Figure 3 is an enlarged end view of the rotatable delivery drum.
Figure 4 is an enlarged side view of a ratchet and pawl mechanism incorporated in the delivery mechanism.

It has been found necessary in the construction of devices adapted to dispense articles from an associated hopper one at a time to provide the hopper with means effective to prevent clogging or jamming of the articles so as to insure a positive delivery of the articles as required. The instant invention suffices to accomplish this in a simple and expedient manner.

The present invention is directed to the dispensing of slender articles from a hopper or magazine one at a time without interruption in the delivery so that the chain of events in the further operation upon the articles is not disrupted, the rate of delivery of the articles depending upon the speed upon which subsequent operations to be performed on the articles are carried out.

The structure herein presented is built around the basic general structure of a hopper and delivery drum incorporated therewith and provides in addition thereto an agitator or rocker plate situated in the hopper having a corrugated surface and adapted to be actuated synchronously with the delivery means for the purpose of effectively aligning the articles to be delivered with the passageway connecting the hopper and delivery drum.

To further assist in an orderly passage of the articles to the delivery drum, the passageway connecting the hopper and drum is of such width as to confine the articles in single file. The hopper is additionally provided with a slidably adjustable wall for the purpose of confining the articles to be delivered with regards to their length.

In the utilization of the present structure in connection with automatic machines wherein delivery of articles to the machines is required in timed relationship to the operation to be performed on the article, a great saving of time is attained in the loading of the hopper inasmuch as the articles for delivery are not required to be placed in the hopper in an orderly fashion thereby reducing the loading time to a minimum. The rocking action of the agitator plate together with the confinement of length of the articles provided between the walls of the hopper rapidly and effectively makes a disorderly array of loaded articles orderly.

Referring to the drawings for more specific details of the invention, 10 represents generally a dispensing device adapted to be mounted on a suitable base (not shown) comprising side walls 12 and 14, front wall 16, and agitator plate 18 mounted upon shaft 20 journaled in the side walls of the dispensing device. Adjacent the free end 22 of the agitator plate 18 and wall 16 is a curved declining passageway 24. The space between the side walls 12 and 14, front wall 16, and plate 18 constitutes a magazine or hopper 26 within which the articles to be delivered are placed. Mounted within the magazine 26 and secured upon shaft 20 is a plate or auxiliary wall 28, said wall being slidable across the plate 18, the distance which it is to be spaced apart from wall 14 being determined by the length of the articles to be delivered such that the plate 18 and wall 14 will effectively confine the articles in the magazine with regards to their length.

A delivery drum 30 fixedly secured to a shaft 32 journaled in the side walls of the dispensing device is mounted adjacent the exit of the passageway 24 and has equally spaced longitudinal grooves 34 in its external surface, said grooves adapted to register one at a time with the exit of the passageway upon rotation of the drum.

The shaft 32 extends beyond side wall 12 and has fixedly secured thereto a ratchet wheel 36, said wheel being engaged by a spring pressed pawl 38 pivoted upon an adjustable bracket 40 journaled on a cylindrical portion of ratchet 36, the bracket being held in adjusted position by a screw 42 threaded in the wall 12. The pawl 38 serves to frictionaly resist rotation of the drum and thereby hold same in proper position with regards to passageway 24. The bracket 40 is rotatably adjustable corresponding to the size of the drum 30 that may be used.

Journaled on the end of the shaft 32 adjacent the ratchet 36 is a bracket 44 having pivoted thereon a spring pressed pawl 46, said pawl engaging the ratchet 36. The bracket 44 comprises arms 48 and 50, arm 48 being connected to suitable mechanism (not shown) through rod 52 to provide for rotation of the bracket, and arm 50 is coupled through suitable links and levers 54 and 56 to the free end of the agitator plate 18.

The agitator plate 18 has a corrugated surface 58 within the magazine 26, said corrugations running perpendicular to the walls 12 and 18 and adapted to provide for alignment of the articles to be fed to the delivery drum so as to inhibit the possibility of the articles clogging in the magazine.

At the front end of the magazine between the confines of walls 12 and 14 is an inclined plate 60, said plate 60 serving to receive the articles as they are discharged from the drum and deliver them to a suitable receptacle, such as that indicated by numeral 62 depending on the operation to be performed on the article after delivery from the drum.

In a normal operation of a dispensing device with the magazine 26 partially filled with articles substantially corresponding in length to the distance between the walls 14 and 28, upon reciprocating actuation of the rod 52 and consequent rotation of the bracket 44, the pawl 46 engages the ratchet 36 resulting in rotating the drum 30 a distance corresponding to the movement in one direction of rod 52, said movement being regulated to correspond with the circumferential distance between the grooves 44. With the reciprocation of the rod and resultant rotation of the drum, the groove 34 adjacent the exit of passageway 24 receives an article whereas the groove 34 adjacent the inclined plate 60 discharges an article. Simultaneously, with the rotation of the drum, the agitator plate 18 is rocked about its pivot through the transmission of motion from bracket 44 through arm 50 to the links and levers 54 and 56 coupling the bracket to the free end of the plate, to thus agitate and thereby provide for alignment of the articles with the passageway 24 and delivery thereto so as to maintain a steady flow of articles to the delivery drum. The speed with which the articles are delivered depends entirely upon the speed of actuation imparted by the reciprocatory motion of rod 52.

While this invention has been described in connection with certain specific embodiments, the principle involved is susceptible of numerous other applications that will readily occur to persons skilled in the art. The invention is, therefore, limited only as indicated by the scope of the appended claims.

What I claim is:

1. In a dispensing device for slender articles, a magazine having an end wall, a rotatable delivery drum, a chute of slightly greater width than the diameter or thickness of the articles to be dispensed connecting the magazine and drum with its entrance in the end wall of the magazine, an agitator plate in the magazine for supporting the articles placed in the magazine having one end pivotally supported at the top of the magazine and its free end oscillatory adjacent to the end wall and the entrance to the chute, and means for simultaneously rotating the drum and rocking the agitator plate.

2. In a dispensing device, a hopper including a curved surface end wall having a passageway in the base thereof, a delivery drum associated with the passageway, a corrugated plate in the hopper having one end pivoted upon the hopper near the top thereof and its other end oscillatory in close substantially constant spaced proximity to the curved surface of the end wall adjacent the entrance to the passageway upon which the articles to be dispensed are supported, said corrugations in the plate running parallel to the axis of the drum, a wall in the hopper arranged perpendicular to the plate and movable in the direction of the corrugations for confining lengthwise the articles to be dispensed, and means for simultaneously rotating the drum and agitating the plate.

3. In a dispensing device for slender articles, a hopper including an end wall having an individual delivery longitudinaly arranged narrow parallel walled substantially vertical chute in the base thereof, a delivery drum adjacent the exit of the chute having longitudinal slots therein of a width corresponding to the width of the chute, a plate pivotally mounted in the hopper at the top rear extremity thereof having its free end adjacent the entrance of the chute fitted for oscillatory movement along the inner surface of the end wall, and means for simultaneously rotating the drum and rocking the plate.

4. In a dispensing device for slender articles, a hopper including an end wall having, a narrow, curved passageway in the base thereof corresponding to the diameter or thickness of the articles to be dispensed, a longitudinally slotted delivery drum mounted adjacent the exit of the passageway, pivotally movable means in the hopper for supporting and aligning the articles to be dispensed having its free end movable along the inner surface of the end wall adjacent to the entrance to the passageway, and means for rotating the drum in stages from one slot to the next slot, adapted to register with the exit of the passageway for receipt of an article therein delivered thereto through the passageway and for simultaneously oscillating the means in the hopper.

5. In a dispensing device, a magazine, for holding a plurality of slender articles, having a passageway in the base of a stationary end wall thereof of a width slightly greater than the diameter or thickness of the articles to be dispensed receiving the articles in single file, a plate having alternate grooves and ridges perpendicular to the side walls of the magazine, said plate providing with the stationary end wall of the magazine a V-shaped trough and being pivotally mounted in inclined position in the magazine with its free end movable in close proximity to the end wall adjacent the entrance opening into the passageway forming the article supporting member in the magazine, a rotatable longitudinally slotted delivery means mounted adjacent the exit of the passageway, and means for simultaneously rotating the delivery means and rocking the plate.

6. In a dispensing device for slender articles, a hopper including a stationary end wall having a curved, narrow passageway in the base thereof, the width of said passageway corresponding to the thickness or diameter of the articles to be dispensed, a corrugated plate in the hopper having one end pivotally mounted in the top rear extremity of the hopper and extending diagonally in the hopper with the other end in close proximity to the end wall adjacent to the entrance of the passageway said corrugations lying parallel to the passageway, said end wall having a curved surface corresponding substantially with the radius arm of the plate such that upon pivotal action of the plate a constant close proximity of the plate to the end wall is maintained a movable wall mounted in the hopper adjustable to the length of the articles to be dispensed, a rotatable delivery means adjacent the exit of the passageway, a ratchet on the delivery means, and means having mechanism associated respectively with the ratchet and plate providing for simultaneous rotation of the delivery means and rocking of the plate.

GEORGE R. REED.

REFERENCES CITED

The following references are of record in the file of this patent:

UNITED STATES PATENTS

| Number | Name | Date |
| --- | --- | --- |
| 327,011 | Norton | Sept. 29, 1885 |
| 547,848 | Davis | Oct. 15, 1895 |
| 635,483 | Hollman | Oct. 24, 1899 |
| 731,243 | Swilling | June 16, 1903 |
| 988,985 | Drucklieb et al. | Apr. 11, 1911 |
| 1,395,248 | Allatt | Nov. 1, 1921 |
| 1,485,099 | Wohl | Feb. 26, 1924 |
| 1,497,576 | Molins | June 10, 1924 |
| 1,497,772 | Conklin | June 17, 1924 |
| 1,825,058 | Goldstein et al. | Sept. 29, 1931 |
| 2,379,724 | Lanham | July 3, 1945 |
| 2,419,242 | Woodbury et al. | Apr. 22, 1947 |